United States Patent Office 3,537,336
Patented Nov. 3, 1970

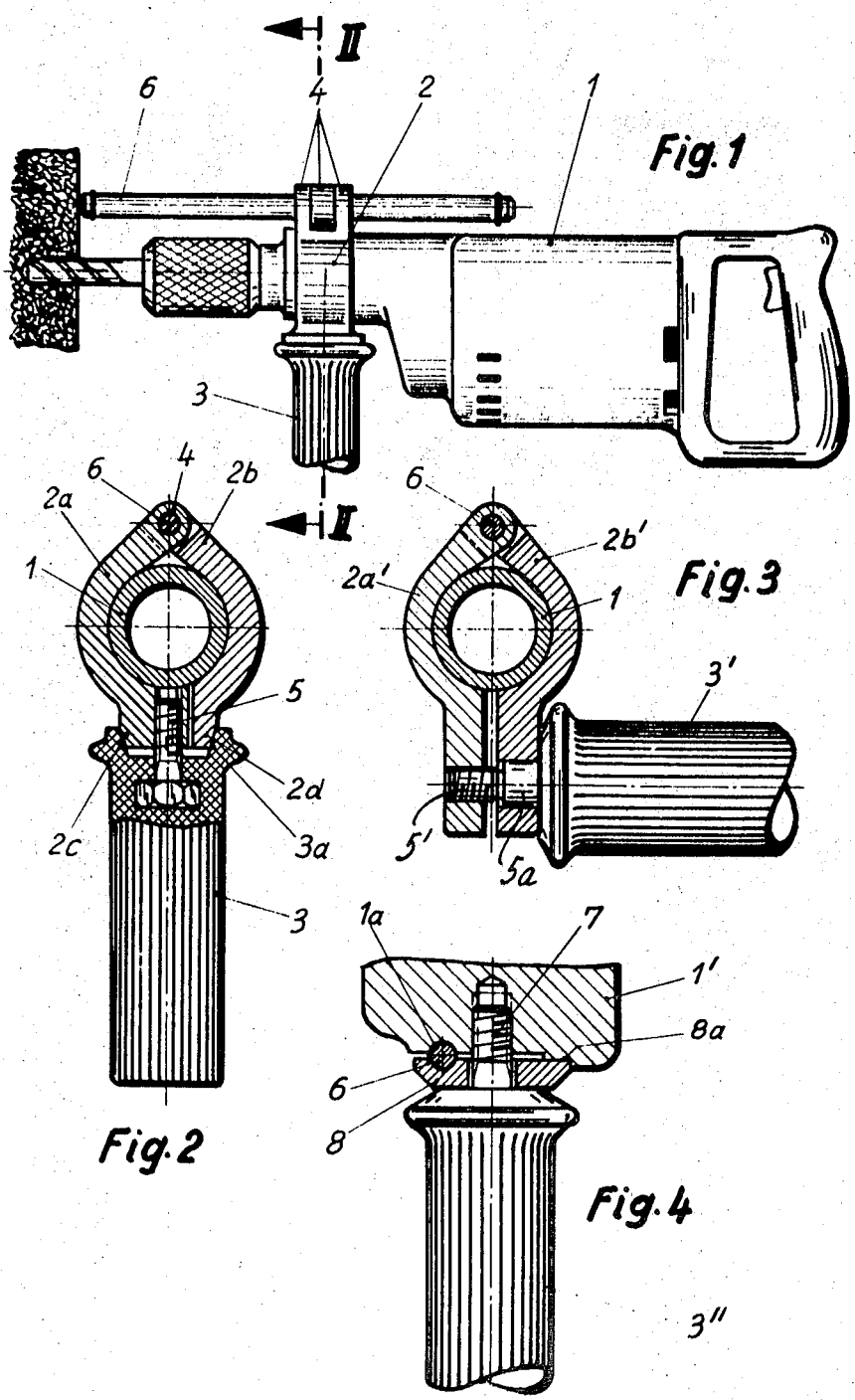

3,537,336
DETACHABLE FASTENING DEVICE FOR CLAMP-
ING DRILLING DEPTH STOP ON DRILL OR THE
LIKE HAVING A GRIPPING HANDLE
Peter Schmuck, Mauren, Liechtenstein, assignor to Hilti
Aktiengesellschaft, Schaan, Liechtenstein
Filed July 10, 1968, Ser. No. 743,877
Claims priority, application Germany, July 24, 1967,
H 59,671
Int. Cl. B23b 45/00
U.S. Cl. 77—7                          8 Claims

ABSTRACT OF THE DISCLOSURE

A drill or the like includes an adjustable drilling depth stop and a gripping handle disengageably secured to the drill body and projecting laterally therefrom. Clamping means are operatively associated with the handle and are engageable with the depth stop, the clamping means being operable by the handle, upon securement of the latter to the drill body, to clamp the depth stop in adjusted position. The clamping means may comprise a hinge clamp with the depth stop forming the pintle of the hinge clamp and the handle serving to compress the hinge clamp around the drill body and to exert the clamping force upon the depth stop.

BACKGROUND OF THE INVENTION

Machines, such as rotary drills, hammer drills, or similar machine tools, provided with gripping handles are known. It is also known to provide tools of this type with an adjustable drilling depth stop, and both the grip handle and the drilling depth stop may be provided in various known manners.

In known machines, separate fastening elements, such as screws, for example, are provided for securing and releasing the adjustable depth stop. Frequently these manually operated securing elements do not have a sufficient gripping ability and cannot be properly secured, so that the depth stop can be accidentally displaced during a work operation. On various machines, the gripping handle and the depth stop, or the respective fastening elements therefor, can be operated only with wrenches or screwdrivers.

Since such machines frequently are used at construction sites, it is possible that the tools, such as the wrenches or screwdrivers, will be misplaced or lost and then must be replaced. A further disadvantage is that these machines are provided with more operating elements than are absolutely necessary, so that the handling of the machines is rendered difficult and the costs are increased.

SUMMARY OF THE INVENTION

This invention relates to the fastening of drilling depth stops on drills and similar machines and, more particularly, to an improved and simplified detachable fastening device for a drilling depth stop adjustably secured on a drill or similar machine tool having a gripping handle disengageably securable thereto.

In accordance with the invention, the above mentioned disadvantages of prior art depth stop securing devices are obviated, and an improved fastening device for the depth stop is provided in an economical manner. To this end, the clamping and releasing of the depth stop and of the grip handle are effected by the same operating element. Preferably, the clamping and releasing of the depth stop and of the grip handle are effected by turning the grip handle. Thereby, loose tools, such as wrenches and screwdrivers, are no longer necessary.

In a preferred embodiment of the invention, the drilling depth stop is used as a hinge pintle or shaft for a hinged clamp which may be closed or opened by the gripping handle.

An object of the invention is to provide an economical fastening device for drilling depth stops, free of disadvantages of prior art arrangements.

Another object of the invention is to provide such a fastening device for a drill or similar machine tool having a gripping handle releasably securable thereto, and in which clamping and releasing of the depth stop and of the gripping handle are effected by the same operating element.

A further object of the invention is to provide such a fastening device in which clamping and releasing of the depth stop and of the gripping handle are effected by rotating the gripping handle.

Still another object of the invention is to provide such a fastening device which does not require any separate tools, such as wrenches and screwdrivers, for fastening and releasing thedepth stop or the gripping handle.

A further object of the invention is to provide such a fastening device in which the drilling depth stop comprises the hinge pintle or shaft of a hinged clamp which is operated by the gripping handle.

Yet, another object of the invention is to provide such a fastening device in which the gripping handle has a threaded stem for securement in a threaded bore of the drill body, and this gripping stem carries a clamping element operable to clamp the depth stop between the clamping element and the body or housing of the drill or similar machine tool.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a side elevation view of a drill equipped with a fastening device embodying the present invention;

FIG. 2 is an elevation view, partly in section, taken along the line II—II of FIG. 1;

FIG. 3 is a view, similar to FIG. 2, of another form of fastening device embodying the invention with a clamp shown in section and a gripping handle shown partially and in elevation; and FIG. 4 is an elevation view, partly in section, illustrating a further embodiment of the fastening device in accordance with the invention, and including a non-variable adjustable grip handle.

DESCRIPTION OF THE PREFERRED EMBODIMENTS

Referring first to the embodiment of the invention shown in FIGS. 1 and 2, a hand drill is illustrated as including a housing 1 formed with a generally cylindrical portion receiving a clamp 2 for securing a gripping handle 3 to housing 1. Clamp 2 is a two-part clamp whose parts are hingedly interconnected at a hinge portion 4. One of the two parts of the clamp 2 has a threaded passage or bore receiving a threaded extension 5 of gripping handle 3, so that the gripping handle may be secured on the cylindrical portion of housing 1 in any desired angular position.

The force exerted on clamp 2 during tightening of grip handle 3 acts, on the hinge side of the clamp, as a counterforce which is utilized, in accordance with the invention, to secure depth stop 6 in adjusted position. This is done by using the depth stop 6 as the hinge pintle or shaft for the clamp 2. Thereby, depth stop 6 is fastened in adjusted position at the same time that gripping handle 3 is secured to the body or housing 1. Due to the grip-type shape of handle 3, a safe securing of depth stop 6 can be obtained without effort and without the use of additional tools.

As illustrated to a somewhat enlarged scale in FIG. 2, clamp 2 comprises two clamping halves 2a and 2b hingedly interconnected by depth stop 6. The free ends 2c and 2d of the clamp halves 2a and 2b, respectively, conjointly form a conical surface which is engageable by a clamping cone 3a arranged or formed in handle 3. Handle 3 carries a threaded extension 5 which can be threaded into a bore of the clamp part 2a and, as handle 3 is tightened by rotating the same, clamping cone 3a compresses the ends 2c and 2d of the clamp, to secure the same about the cylindrical portion of housing 1. The resulting force transmitted to the hinged ends of the clamp parts 2a and 2b exerts a clamping effect on depth stop 6 forming the hinge pintle of the clamp 2.

In the embodiment of the invention shown in FIG. 3, the clamp is again a hinge clamp comprising clamp parts 2a' and 2b' hingedly interconnected by the depth stop 6 acting as a hinge pintle. In this embodiment of the invention, handle 3' extends perpendicularly to the parting plane of the clamp parts 2a' and 2b', and includes a threaded stem 5' threadable into a threaded bore in clamp part 2a' and including an unthreaded and somewhat larger portion 5a extending into a smooth bore in clamp part 2b'. In the arrangement of FIG. 3, the clamp parts 2a' and 2b' are tightened, along with handle 3', by a direct screw connection rather than through a tightening cone 3a, as in FIG. 2.

The invention is also directed to securing of depth stop 6 in position by securing of the gripping handle in position but without the use of clamp halves, in an embodiment of the invention wherein the angular position of the gripping handle on the housing 1 of the drill or similar tool is not adjustable. Such an arrangement is shown in FIG. 4.

Referring to FIG. 4, gripping handle 3" is provided with a threaded projecting stem 7 which is arranged to be threaded into a threaded bore in housing 1'. Adjacent this threaded bore, housing 1' is formed with an outwardly opening semi-cylindrical groove 1a in which is seated a depth stop 6. A pressure plate 8 fits loosely over threaded stem or projection 7, and is formed with a semi-cylindrical outwardly opening groove facing the groove 1a so that depth stop 6 is seated in the two grooves. On one side, pressure plate 8 bears on a seat 8a formed on housing 1'. In this embodiment of the invention, the depth stop 6 is again clamped to the adjusted position simultaneously with securing of gripping handle 3" to housing 1', by rotation of grip 3" to engage stem 7 in the threaded bore in housing 1', thus pressing plate 8 toward housing 1' to grip depth stop 6 between pressure plate 8 and housing 1'.

What is claimed is:

1. In drills and similar machine tools having a gripping handle and a drilling depth stop, a detachable fastening device for clamping and releasing said depth stop comprising, in combination, a handle member of said gripping handle, disengageably securable to said drill; and clamping means operatively associated with said handle member and engageable with said depth stop, said clamping means being operable by said handle member, upon securement thereof to said drill, to clamp said depth stop in adjusted position.

2. In drills and similar machine tools having a gripping handle and a drilling depth stop, a detachable fastening device for clamping and releasing said depth stop, as claimed in claim 1, in which said handle member is securable to said drill by rotation of said handle member and such rotation of said handle member operates said clamping means to clamp said depth stop in adjusted position.

3. In drills and similar machine tools having a gripping handle and a drilling depth stop, a detachable fastening device for clamping and releasing said depth stop, as claimed in claim 2, in which said clamping means is formed with a threaded bore receiving a threaded extension on said handle member.

4. In drills and similar machine tools having a gripping handle and a drilling depth stop, a detachable fastening device for clamping and releasing said depth stop, as claimed in claim 2, in which said drill is formed with a threaded bore receiving a threaded extension on said handle member.

5. In drills and similar machine tools having a gripping handle and a drilling depth stop, a detachable fastening device for clamping and releasing said depth stop, as claimed in claim 1, in which said clamping means comprises a two-part hinged clamp arranged to embrace a portion of a housing of said drill; said drilling depth stop forming the hinge pintle of said two-part clamp; said handle member being operatively engageable with the free ends of said two parts of said clamp to force the same into clamping engagement with said housing portion and to exert clamping pressure on said drilling depth stop.

6. In drills and similar machine tools having a gripping handle and a drilling depth stop, a detachable fastening device for clamping and releasing said depth stop, as claimed in claim 5, in which the free ends of said two clamp parts conjointly define a conical surface; one of said clamp parts having a threaded bore; said handle member having a threaded extension engageable in said threaded bore and being formed with a tightening cone portion engageable with said conical surface to clamp said clamp parts around said housing portion.

7. In drills and similar machine tools having a gripping handle and a drilling depth stop, a detachable fastening device for clamping and releasing said depth stop, as claimed in claim 5, in which one of said two clamp parts is formed with a threaded bore and the other of said two clamp parts is formed with a relatively smooth bore coaxial with said threaded bore; said handle member being provided with a threaded stem engageable with said threaded bore and a smooth portion engageable in the bore of said other part, said handle member bearing against said other part to force said two clamp parts into clamping engagement with said housing portion.

8. In drills and similar machine tools having a gripping handle and a drilling depth stop, a detachable fastening device for clamping and releasing said depth stop, as claimed in claim 4, in which said threaded bore is formed in a portion of the housing of said drill and said portion is formed with a semi-cylindrical cross section groove adjacent said threaded bore and seating said depth stop; said clamping means comprising a pressure plate fitting loosely on said threaded extension of said handle member and formed with a semi-cylindrical cross section groove engageable with said drilling depth stop, and seated on a seat on said housing portion substantially diametrically opposite said semi-cylindrical grooves; said handle member, upon engagement of said threaded extension in said threaded bore forcing said pressure plate against said drilling depth stop to clamp the latter in said two semi-cylindrical grooves.

References Cited

UNITED STATES PATENTS 2,978,931   4/1961   Broden _____ 77—7

FRANCIS S. HUSAR, Primary Examiner

U.S. Cl. X.R.

77—55; 145—129